United States Patent [19]

Grisell

[11] 3,768,227

[45] Oct. 30, 1973

[54] METHOD OF DISSIPATING STATIC ELECTRICITY IN PACKAGING

[76] Inventor: Richard T. Grisell, 615 S. 6th St., Terre Haute, Ind.

[22] Filed: Sept. 16, 1970

[21] Appl. No.: 72,865

Related U.S. Application Data

[63] Continuation-in-part of Ser. No. 51,014, June 29, 1970, abandoned.

[52] U.S. Cl.......................... 53/36, 264/22, 317/2 R
[51] Int. Cl............................................. B65b 61/00
[58] Field of Search.................. 53/36, 14; 317/2 R; 264/22, 23, 337, 338; 18/5 BJ, 5 BZ

[56] References Cited
UNITED STATES PATENTS

| | | |
|---|---|---|
| 3,068,511 | 12/1962 | Ahlbeck et al...................... 317/2 R |
| 3,201,911 | 8/1965 | Woodland.............................. 53/36 |
| 3,532,932 | 10/1970 | Simon ................................. 317/2 R |
| 3,572,499 | 3/1971 | Mondano........................... 317/2 R |
| 1,275,585 | 8/1918 | Morgan et al....................... 317/2 R |

*Primary Examiner*—Robert L. Spruill
*Attorney*—Robert H. Dewey

[57] ABSTRACT

A method for the dissipation of, or for preventing the accumulation of, a static charge of electricity resulting from friction between two contacting materials comprising the steps of positioning an electrical conductor having two or more ends, or a plurality of said conductors, between said contacting materials and connecting one end of said conductor to the positive pole of an e.m.f. source and connecting the negative pole of the e.m.f. source to the ground.

5 Claims, No Drawings

METHOD OF DISSIPATING STATIC ELECTRICITY IN PACKAGING

CROSS-REFERENCE TO RELATED APPLICATIONS

This application is a continuation-in-part of my co-pending application U.S. Ser. No. 51,014, filed June 29, 1970 now abandoned.

BACKGROUND OF THE INVENTION

This invention relates to a method of dissipating static electricity. In a particular aspect, this invention relates to a method of dissipating static electricity which accumulates during the process of packaging articles in cellular plastic material or in removing the articles from the packages, and which also accumulates during the process of molding plastics and resins.

It is known, e.g. from Freeman, U.S. Pat. No. RE 24,767, or from Grisell, U.S. Pat. No. 3,647,725 to package an article in a cellular plastic material by enclosing it in a flexible plastic envelope, such as polyethylene, supporting the article in an outer container, and filling the void with a cellular plastic material such as polyurethane, thereby encapsulating the wrapped article. It is also known to package plastic-wrapped articles in a preformed plastic shell. These and similar methods of packaging have been very successful in safe shipment of articles, particularly fragile articles subject to damage by shock.

One of the problems encountered in the encapsulation is the development of static electricity during the step of encapsulating the wrapped article in the cellular plastic. It is well known that many materials, including dissimilar materials in contact with each other, develop large charges of static electricity due to friction. This is also true of many similar and dissimilar plastic materials. In the aforedescribed packaged articles, the static charge is a problem ranging from one of minor annoyance to one of serious consequences. An example of the latter would be ignition of a flammable or combustible substance due to a spark resulting at the moment of discharge of the accumulated static. The electrically insulating properties of the cellular plastic tend to prevent the gradual dissipation of the charge and it remains present until the package is opened and the charge is dissipated. Furthermore, even if means were found to prevent static accumulation during the encapsulation step, the problem usually recurs on opening the package as a result of friction between the flexible plastic wrapping and the cellular plastic capsule.

It is also known to package articles wrapped in a thin, flexible, plastic film in pre-shaped plastic shells, e.g. molded polystyrene and the like, then sealing the package. Static electricity accumulates in such packages during handling and shipping and is especially troublesome during the step of opening the package. Large charges frequently develop sufficient to result in arcs or sparks capable of igniting combustible material.

The accumulation of static electricity is also a problem in the general process of molding plastics and resins by introducing a flowable plastic- or resin-forming composition into a mold lined with a mold release agent, then forming the molded plastic or resin composition. The encapsulation process and the use of preformed shells can be broadly regarded as special cases of such a process in that the plastic wrapping performs the same function of a mold release agent and in fact many plastic films are used in this manner. Certainly the problem is the same and arises from the same source, namely from friction between two dissimilar materials.

Many attempts have been made to eliminate or prevent these static charges, usually by incorporating antistatic additives in the plastic. However, for a variety of reasons these attempts have either been unsuccessful or at least unsatisfactory. Simple grounding is usually without significant effect. Accordingly a long-felt need has existed for a satisfactory solution to this problem.

SUMMARY OF THE INVENTION

It is an object of this invention to provide an improved method of packaging articles by dissipating static electricity.

It is generally the object of this invention to provide a method of dissipating static electricity arising as a result of friction.

It is another object of this invention to provide an improved method of dissipating static electricity in the process of packaging a plastic wrapped article in a dissimilar cellular plastic material.

It is yet another object of this invention to provide a method of dissipating static electricity from an article packaged in plastic wrapping and enclosed in a preformed shell.

It is still yet another object of this invention to provide a method of dissipating static electricity during the process of molding plastics and resins in a preformed mold.

Other objects of this invention will be readily apparent to those skilled in the art from the disclosure herein.

A method has been discovered for the dissipation of, or for preventing the accumulation of, a static charge of electricity resulting from friction between contacting materials, particularly between contacting surfaces of dissimilar materials. The invention comprises providing a generally elongated electrical conductor or a plurality thereof between the contacting surfaces of the static-producing materials and connecting the conductor to the positive pole of a source of electro-motive force and connecting the negative pole thereof to the ground. The invention has particular utility in, for example, dissipating the static which tends to accumulate during the process of packaging a plastic wrapped article by encapsulation in cellular plastic; or in dissipating static electricity from a package containing an article which has been wrapped in a flexible plastic film then packaged in a preformed shell or mold; or in dissipating static electricity which tends to accumulate during the process of molding plastics and resins by introducing a plastic or resin-forming composition into a mold, then forming the molded plastic or resin composition. Usually the mold is lined with a mold-release agent, but some molds, e.g. Teflon, are self-releasing.

DETAILED DISCUSSION

According to one embodiment of the present invention, the article to be packaged is placed in a flexible plastic enclosure, e.g. a polyethylene envelope or is wrapped in a flexible sheet of plastic, as is known in the art. During this step of the process an elongated electrical conductor, or a plurality thereof, is positioned preferably but not necessarily along the interior of the plastic envelope or wrapping for about one-half its length and then passed through an opening in the wrapping. The remaining portion of the conductor is positioned along the exterior of wrapping so that it is contacted by the cellular plastic during the encapsulation step. Alternatively, the electrical conductor can be positioned entirely on the exterior of the plastic wrapping, especially polyethylene wrapping, and contactable with the cellular plastic. It is not intended that the invention be limited as to exact placement of the conductor.

After the conductor is secured in place, as set forth hereinafter, one end of the electrical conductor is then connected to the positive terminal of an electromotive force (e.m.f.) source, such as the positive pole of a storage battery or a dry cell battery, and the negative terminal of the e.m.f. source is connected to the ground. The plastic-wrapped article is then encapsulated in cellular plastic, e.g. polyurethane foam, and when the encapsulation is complete, the e.m.f. connection is broken. The conductor can be removed if desired or may be left in place. The resulting package is without static electricity charge and none will develop during shipment or prolonged storage or opening of the package, provided the package and flexible wrapping are opened by use of rip strips provided by methods known in the art.

In another embodiment of this invention, the plastic wrapped article is packaged in a preformed shell, e.g. a molded plastic or cellular plastic shell. The conductor, or a plurality thereof, is positioned between the shell and the plastic as previously described. When desired, about half of the conductor is placed with the enclosure formed by the plastic wrapping and contactable therewith. At least one end of the conductor is allowed to protrude or extend beyond the shell so that it can be connected to the positive pole of the e.m.f. source. The package is then securely closed by sealing, etc. During shipping and handling, static electricity accumulates in the package. When it is desired to discharge the static, as preparatory to and during the opening of the package, the conductor is connected to the positive pole of the e.m.f. source, the negative pole of which is connected to the ground, as hereinbefore set forth. The charge is thereby dissipated and the package is then substantially free from static and can be opened safely.

It is apparent from the disclosure herein that the method of preventing accumulation of static electricity or discharge of accumulated static electricity, can be broadly applied to numerous situations where such static electricity is a problem. Many such applications will be readily apparent to those skilled in the art. In a broad sense, for example, the plastic wrapping, e.g. the polyethylene film, is essentially a mold release agent or it can be considered to constitute a mold dissimilar in nature to the material being molded. For example, in the molding of polyester resins, static accumulation during the introduction of the fluid material into the mold frequently interferes with proper mold release, or, worse, the discharge of accumulated static can cause a spark resulting in a disastrous conflagration. It is therefore one embodiment of the present invention to prevent accumulation of static in the process of molding plastics and resins, wherein a mold is coated or lined with a mold release agent, by the steps of placing one or a plurality of electrical conductors in contact with the mold release agent and contactable with the material to be molded. Each conductor is connected to the positive terminal of an e.m.f. source, or plurality thereof, the negative terminal of which is connected to the ground, and the molding plastic or resin is then introduced into the mold. If there is any tendency to accumulate static during the molding step, the process of this invention will substantially eliminate same.

The present invention is applicable to a wide variety of articles from small to very large and of any conceivable shape. As is known, the article to be packaged must be protected from the cellular plastic material in which it is to be encapsulated or packaged, for otherwise the cellular plastic would adhere to the article. Polyethylene envelopes or wrappings are widely used for this purpose. However it is not intended that the invention be limited to polyethylene. It can be employed with waxed paper or any plastic, many of which are known, e.g. polyvinylidene chloride (Saran). During the encapsulating step, air is exhausted through a vent provided in the envelope or wrapping and during this step the static electricity charge develops.

Such a package, if generally cylindrical or rectangular in shape, can be generally described as having two opposite ends. If generally spherical, an axis having two opposite poles can be assigned and the poles can be generally described as the "ends" of the package. If the package is polygonal in shape, two opposing faces separated by a greater distance than any other two faces can be generally described as the "ends" of the package.

According to the present invention, an electrical conductor, including, but not limited to, a copper, aluminum, or iron wire or wand, preferably copper, is incorporated in the wrapped package. The wand is generally of a length somewhat longer than the article and has two or more ends. It is positioned in contact with the plastic wrapping either outside thereof and wholly contactable with the encapsulating cellular plastic; or preferably so that about one half is inside the enclosure containing the wrapped article and in contact with the wrapping, and the remaining half is on the outside of the wrapped article and in contact with the wrapping. Contact with the wrapping is usually provided by the cellular plastic during the encapsulation step. However contact can also be maintained by any other suitable method, many of which are known; one satisfactory method is merely to anchor the wand in place by means of a plurality of strips of adhesive tape or strip-off tape. It is not necessary that the wand be in coherent contact throughout its length. Gaps in the contact can occur without departing from the invention. After the wand is positioned, it is connected with the positive pole of an e.m.f. source and the negative pole of the e.m.f. source is attached to a ground. Preferably, but not necessarily, the end protruding from within the wrapping is connected to the positive pole of the e.m.f. source, but the connection can also be made at the internal end by piercing the wrapping, or it can be made at an intermediate point between the ends.

In packaging a large article, or one of irregular shape, a plurality of wands disposed about the article can be used. In this case it is generally preferred to use a separate e.m.f. source for each wand.

The thickness or size of the wand may vary considerably. Although a flexible wire is generally preferred, for convenience, a flattened strap is also suitable. Also a rigid rod or a hollow tube is contemplated. Multifilament "lamp cord" from which the insulation has been removed is also suitable. The wand should be a good electrical conductor and should be "bright metal," i.e. generally free from an oxide coating or other corrosion product which might tend to have an insulating effect, thereby rendering the method ineffective.

The electromotive force source can be any source which will result in discharge of the accumulating static. Generally a storage battery, e.g. of the automotive type, or a dry cell is suitable. A 1.5 volt cell can be used, especially for small packages, although it will have a shorter life than, for example, a 6-volt dry cell. Generally a dry cell is preferred for routine use. It is also contemplated that other e.m.f. sources can be employed. These include current from a direct source, such as a transformer or other rectifier means.

It is known in the art to employ tear strips with encapsulated packages in order to make them easier to open. In particular, it is known to secure a wire, rope or cable or the like directly to the plastic wrapping or envelope by high tensile strength adhesive tape prior to encapsulation. The use of these tear strips, or rip strips, for opening the package not only tears through the cellular plastic, but also rips the plastic envelope simultaneously. The article is thereupon exposed and easily removed without danger of a static charge developing. Accordingly the maximum benefits of the invention are realized when the wrapped article is encapsulated with tear strips.

The invention and the process to which it most closely relates is essentially an improved method of packaging articles in a rigid cellular plastic sheath by the steps of wrapping an article in a flexible sheet thereby forming an enclosure; positioning an electrically conducting wand generally along the longest dimension of the article, the wand being of approximately the same length as the article; and at about the mid-point of the longest dimension of the article, piercing the sheet and passing the wand into the interior of the enclosure but adjacent to and generally in contact with the sheet. Obviously this latter step can also be performed prior to actually wrapping the article and when so, the wand can be secured to the wrapping at one or more points by adhesive tape if desired. A plurality of wands can also be provided when desired. The end of the wand need not necessarily terminate within the wrapping, but optionally may be passed through the wrapping and terminate outside of the enclosure.

As stated above, the wand is of about the same length as the article and is passed through the wrapping at about the mid-point of the article, whereby about half of the wand is inside and the other half is outside of the wrapping and generally adjacent to and contactable, or in contact, therewith.

Alternatively, the electrical conductor can be positioned entirely on the exterior of the plastic wrapping, especially polyethylene wrapping, and contactable with the cellular plastic. It is not intended that the invention be limited as to exact placement of the conductor.

Additional steps of the process include sealing the enclosure formed by the plastic sheet; placing the wrapped article in a preformed mold or outer shell so that one end of the wand extends outside the shell and sealing same; or, when to be encapsulated, placing the article in a container and spaced from the bottom, sides, ends and tops thereof; placing one or more tubular vents having one end inside of said enclosure and the other end outside of said mold or outer container; providing tear strips for opening said enclosure along with the encapsulating cellular sheath; connecting one end of the electrically conducting wand to the positive terminal of an e.m.f. source outside of the mold.

In positioning a large article in the mold, it may be preferred to provide a channel, or plurality thereof, in the bottom of the encapsulated package so that the final package can be conveyed by, for example, a fork lift truck, or by cables and a crane. As is known, such a channel is suitably provided by placing a matrix having the shape of the desired channel in the bottom of the mold and generally at right angles to the longest dimension of the package. The matrix is wrapped in a flexible plastic sheet to prevent adherence to the cellular plastic sheath and static electricity also accumulates here during the encapsulation process. When desired, this accumulation of static can also be prevented by the use of a wand in the same manner as hereinbefore described.

After the wand, or plurality thereof, is connected to the e.m.f. source and the tear strips are extended outside of the mold, the mold is closed and foamable, cellular plastic forming material is injected into the mold through ports provided therefor. The e.m.f. connections are broken and the wand can be removed or left in place. The article is then removed from the mold. Apertures in the plastic sheath, if any, are sealed as is known and the encapsulation process is substantially complete.

Although the foregoing description relates to the practice of the invention with respect to the use of closed molds for encapsulation, it is equally useful when applied to the "foam-in-place" process using a mold or container open at the top.

In the embodiment wherein the wrapped article is packaged in preformed plastic shell with the wand extending outside thereof, little or no static develops during the packaging step, but large amounts may accumulate during shipping and handling due to movement of the article within the shell. Prior to and/or during the opening of the package, the static is discharged by connecting the wand to the e.m.f. source and thereby formation of a spark is prevented.

I claim:

1. A method of preventing accumulation of static electricity in the method of packaging an article by encapsulating said article in cellular plastic material by the steps of enclosing said article in a flexible plastic sheet or envelope, providing a vent from the interior of said enclosed article extendable to the exterior of said encapsulating cellular plastic material, placing said wrapped article in a container spaced from the bottom, sides, and top thereof, and injecting a cellular plastic forming material into said container so that said cellular plastic surrounds and encapsulates said wrapped article, comprising the step of positioning an electrical conductor, or a plurality thereof, of approximately the same length as said article in a manner such that about one-half the length of said conductor is within the enclosure formed by said plastic sheet or envelope and in contact therewith and the remaining half of said conductor is outside of said enclosure and in contact with the plastic sheet or envelope and connecting said conductor to the positive terminal of an electromotive force source having a positive and a negative terminal and connecting the said negative terminal to a ground.

2. The method of claim 1 wherein the positive terminal of said e.m.f. source is connected to the end of said conductor outside of said enclosure.

3. The method of claim 1 wherein the positive terminal of said e.m.f. source is connected to the end of said conductor within said enclosure.

4. The method of claim 1 wherein the said e.m.f. source is a dry cell battery.

5. A method of dissipating or preventing the accumulation of a static charge of electricity in a process for molding plastics and resins by injecting a moldable plastic into a mold lined with a mold release agent, comprising the steps of positioning an electrical conductor having two or more ends in contact with said mold release agent, and contactable with said injected moldable plastic, and connecting one end of said conductor to the positive pole of an e.m.f. source, and connecting the negative pole of said e.m.f. source to a ground, during the steps of injecting said mold with said plastic, effecting the molding thereof, and removing said molded plastic from said mold.

* * * * *